W. N. ALLAN.
VEHICLE WHEEL.
APPLICATION FILED JUNE 2, 1920.
1,374,798.
Patented Apr. 12, 1921.
2 SHEETS—SHEET 2.
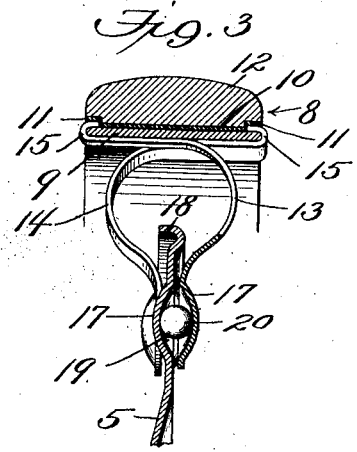
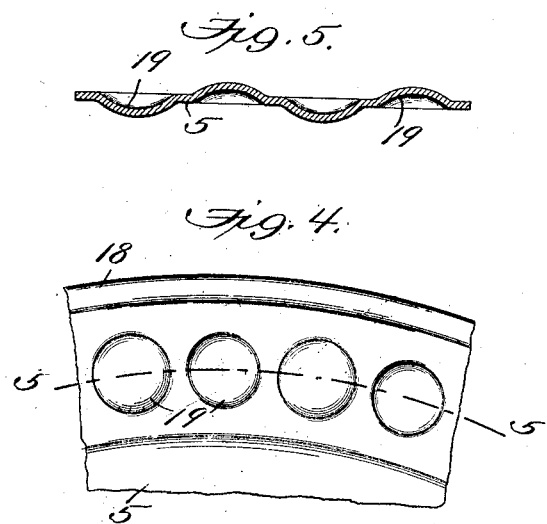
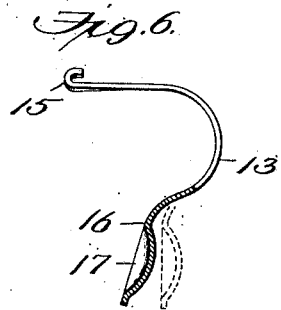
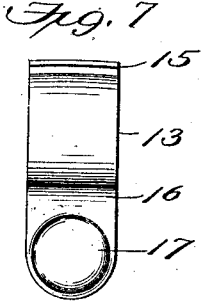
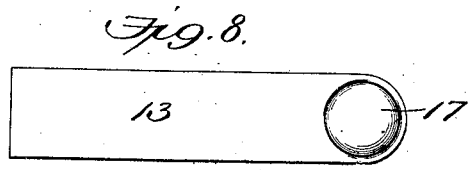
INVENTOR
William N. Allan
BY
ATTORNEY //www.wikidata.org/wiki/Q1

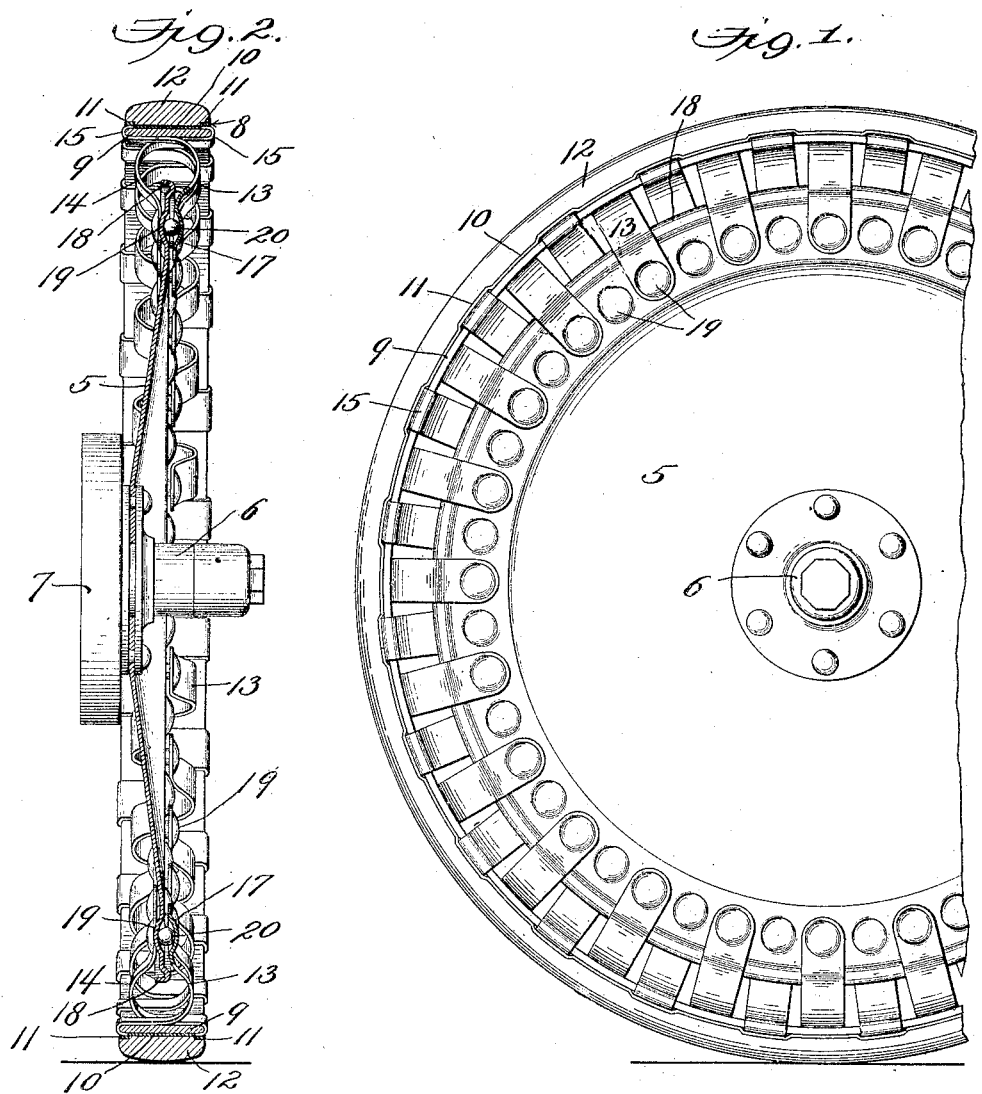

UNITED STATES PATENT OFFICE.

WILLIAM N. ALLAN, OF SAN ANTONIO, TEXAS.

VEHICLE-WHEEL.

1,374,798.  Specification of Letters Patent.  Patented Apr. 12, 1921.

Application filed June 2, 1920. Serial No. 386,004.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to vehicle wheels of the disk type, and particularly to means for practically associating a resilient tire therewith. The present invention is an improvement on the wheel disclosed by my pending application, Ser. No. 375,336, filed April 20, 1920, and whereby the same form of tire shown in the said application may be adapted to a disk wheel. In the aforesaid application a series of spring bearing units are interposed between the felly of the usual form of spoke wheel and tread organization of the tire, the parts being assembled in a positively acting association without the use of fastening bolts, rivets, screws or analogous penetrating fastenings. The similar spring units of the present improvement have socket extremities closely overlapping and freely movable or shiftable relatively to opposite sides of a disk which has sockets directly formed therein complemental to the sockets of the spring unit extremities, antifrictional means being disposed in the sockets to serve as movable connecting means for the spring extremities and the disk and providing for a relative reciprocation, torsional and lateral swaying movement of the said spring extremities and disk to compensate for the various regular and irregular pressure stresses and the shocks and vibrations to which a tire is subjected during travel over a road surface. A further purpose of the improvement is to provide a sensitively resilient and easy riding disk wheel which may be expeditiously constructed and assembled and having a strong and durable character to increase the efficiency of service and minimize the cost of production and upkeep of this class of wheels. The improved disk and tire also may be characterized as a boltless or rivetless organization in view of the absence in the assemblage of the several parts thereof of any penetrating fastening means, and the particular and preferred association of the spring extremities and the disk eliminates all tendency to crystallization and fracture of the spring extremities and the portions of the disk in coöperation therewith.

A preferred embodiment of the improved disk and tire is illustrated in the accompanying drawings, and therein:—

Figure 1 is a side elevation of a portion of the disk wheel comprising the features of the invention.

Fig. 2 is a transverse vertical section through the improved wheel and tire.

Fig. 3 is an enlarged transverse vertical section of a portion of the tire and disk and also illustrating one of the spring units partially in section.

Fig. 4 is an enlarged side elevation of a portion of the disk.

Fig. 5 is a horizontal section taken on the line 5—5 of Fig. 4.

Figs. 6, 7, 8 and 9 are detailed views of one of the spring units.

The numeral 5 designates a disk which is dished as usual and provided with a central hub 6 including, as shown by Fig. 2, a brake drum 7. It will be understood, however, that the improved features may be applied to either the rear or front wheels of a motor vehicle. The disk 5 with its hub is resiliently sustained in operative position within an outer tire organization 8 comprising a resilient band 9 of suitable material continuing around the inner portion of the tire. Applied on the outer side of the band 9 is a thin sheet metal resilient band 10 having at opposite side edges outstruck seats or recesses 11 arranged in alternate positions at opposite side edges of the said band 10, or the seats or recesses at one side edge of the band 10 are opposite the unrecessed portions of the remaining side edge of the same band. Over the band 10 and secured thereto is a solid resilient or rubber tread 12, the band 10 and tread 12 being formed as a unit by suitable means.

Between the tread organization 8 and the periphery of the disk a plurality of spring units 13 and 14 are interposed and are of the form shown in detail by Fig. 6 when they are applied to the tread organization and disk. Primarily these spring units are of the shape and construction shown by Figs. 8 and 9, and the outer extremity of each unit is bent to form a catch or hook 15, and the body of the spring unit is shaped to have a normal inward projection as at 16, or, in other words, each spring unit is partially bowed and formed with a practically straight inner extremity which is formed with an inwardly opening socket 17, the socket being preferably of semispherical form or contour, as illustrated by Fig. 6. The spring units are applied by having the outer catch or hook extremities 15 thereof fitted in the seats or recesses 11 which provide spaces relatively to the spring band 9 against the outer side of which and over the opposite side edges the said hooks or catches 15 firmly engage. The spring units are disposed in alternation relatively to the opposite sides of the tread organization or unit, or so that the outer catch or hook extremity 15 of one unit will engage with one side of the tread organization or unit or the spring band 9 and one of the recesses 11, and the next spring unit will have its similar outer catch or hook extremity 15 in engagement with the opposite side of the spring band and fit in the adjacent seat or recess 11. When the outer catch extremities of the spring units are arranged as just described, it will be seen that they serve to prevent lateral as well as longitudinal shifting movement of the tread organization or unit, and by shielding the outer catch or hook extremities of the spring units within the seats 11, wear or deterioration of the solid tread member 12 is prevented, and, furthermore, the said outer extremities of the spring units are given a very positive securement. The outer catches or hooks 15 of the spring units may be easily assembled in secured relation to the tread organization or unit 8, or be separated from said latter unit, and anyone of these spring units may be removed and replaced by another similar spring unit when found necessary without disorganizing or detaching the remaining units or dismantling the entire wheel. The disk 5 has its outer or peripheral edge laterally bent as at 18 to provide a reinforce for or to stiffen the said outer edge of the disk, and at a suitable distance inwardly from the laterally bent or flanged outer edge of the disk sockets 19 are formed in circular alinement fully around the disk and in alternation, or, the sockets open outwardly in a reverse manner in regular sequence around the disk so as to provide for coöperation with the sockets 17 at the inner extremities of the spring units 13 and 14. The sockets 19 of the disk 5 are formed by indenting the disk alternately in reverse directions, and the said sockets 19 are of the same dimensions as the sockets 17 of the spring units and are also semispherical. In assembling and connecting the spring units relatively to the disk, the inner socket extremities 17 of the units are drawn outward from the normal position shown in Fig. 6 to the dotted line position shown in the same figure until they aline with or are disposed over the sockets 19, each spring unit being reversed in alternation to bring its socket 17 in proper assembling relation with the corresponding socket 19 of the disk. Between the sockets 17 of the springs and the sockets 19 of the disk antifrictional balls or similar devices 20 are interposed and serve to movably associate the sockets of the spring units and disk in such manner that separation or disjointure of the inner extremities of the spring units relatively to the sockets of the disk is prevented and at the same time the springs are disposed for loose reciprocating action, or so that there may be a relative reciprocation or sliding movement by the disk and spring units, and, furthermore, lateral and torsional movements are provided for by the association of the spring units and disk as specified.

By arranging the spring units 13 and 14 in alternation as explained and shown in the drawings, accidental separation of the said units from the disk and the tread organization or unit will be prevented in view of the fact that when the tire organization is subjected to weight pressure, shocks and jars, or to lateral stress movements, the said spring units will pull inwardly across and within the confines of the tread unit close to the spring band 9, and, as a consequence, the inward pulling stresses on the outer extremities of the spring units or the hooks 15 will be increased relatively to the tread unit and particularly the spring band 9. The free reciprocation or sliding movement of the inner spring extremities relatively to the disk through the provision of the coöperating sockets in the respective parts and the antifrictional balls or analogous devices 20 in engagement with the said sockets will reduce wear on the interacting parts to a minimum, and it will be practically impossible for the inner extremities of the spring units to become accidentally disengaged or disconnected from the disk. In addition to the reinforcing or stiffening structure at the periphery of the disk 5 as provided by the flange 18, the said latter flange will also serve as a stop means to engage the inner adjacent part of the tread organization or unit and limit the compression when the latter is excessive or extremely abnormal.

It will be seen that the spring units and disk are operatively and positively connected without the use of bolts, rivets or other devices that might have a tendency to structurally deteriorate the several parts or reduce the strength thereof, and, likewise, the spring units are assembled with the tread organization or unit in a manner which will entirely obviate the necessity of using penetrating fastening means. Moreover, the improved wheel is reduced in cost of manufacture in view of the simplicity of associating the disk with the spring units and the tread organization or unit, and at the same time the advantages of a resilient tread unit mounting with relation to the disk is obtained and a superior disk wheel provided at a materially reduced cost of production.

What is claimed as new is:

1. In a device of the class specified, the combination of a disk having sockets adjacent to the periphery thereof, a tread unit surrounding the disk, and spring units interposed between the tread unit and disk and having sockets at their inner extremities disposed on opposite sides of the periphery of the disk in coöperation with the sockets in the latter, and antifrictional devices interposed between the sockets of the spring units and disk.

2. In a device of the class specified, a disk, a tread unit surrounding the disk and spaced from the latter, and spring units interposed between the tread unit and disk, the inner extremities of the spring units and the disk having a relative reciprocating association.

3. In a device of the class specified, a disk having sockets reversely disposed therein adjacent to the periphery, a tread unit surrounding and spaced from the periphery of the disk, spring units connected to the tread unit and having sockets at their inner extremities alternately disposed opposite to the sockets of the disk, and antifrictional means interposed between the sockets of the spring units and disk.

4. In a device of the class specified, a disk, a tread unit surrounding and spaced from the periphery of the disk, and spring units connected to the tread unit and having their inner extremities disposed on opposite sides of the disk in free sliding relation to the latter.

5. In a device of the class specified, a disk having sockets directly formed in reverse relation therein in regular alternation, a tread unit surrounding and spaced from the periphery of the disk, and spring units interposed between the tread unit and disk and having sockets formed in their inner extremities, the sockets of the spring units being alternately disposed opposite the sockets of the disk and the disk and units having antifrictional means engaging the sockets thereof to provide for free relative reciprocation of the disk periphery and the spring units.

6. In a device of the class specified, a disk having the periphery thereof laterally flanged to stiffen the same, a tread unit surrounding the disk and embodying a solid elastic tread member, and spring units interposed between the tread unit and disk and connected to the said unit the inner extremities of the spring units having sliding association with the disk, the laterally flanged periphery of the disk also serving as a stop means to engage the tread unit when excessive pressure stresses are imposed upon the same.

7. In a device of the class specified, a disk having a laterally flanged periphery to serve as a stop means, the disk also having reversely arranged sockets in alternation therearound and directly formed therein, a tread unit surrounding and spaced from the periphery of the disk, spring units connected to the tread unit and having inner extremities formed with sockets disposed in alternation opposite the sockets of the disk, and antifrictional devices interposed between and engaging the sockets of the spring units and disk.

In testimony whereof I have hereunto set my hand in presence of two subscribing witnesses.

WILLIAM N. ALLAN.

Witnesses:
 JAMES I. MURPHY,
 JOHN T. FARDY.